(No Model.) 3 Sheets—Sheet 1.

E. T. WINKLER.
ICE MAKING AND REFRIGERATING MACHINE.

No. 452,536. Patented May 19, 1891.

Fig. I.

WITNESSES:
Chas. F. Van Horn
Wm. H. Van Horn

INVENTOR
E. Theodore Winkler
By S. J. Van Stavoren
ATTORNEY (No Model.) 3 Sheets—Sheet 3.
E. T. WINKLER.
ICE MAKING AND REFRIGERATING MACHINE.
No. 452,536. Patented May 19, 1891.

WITNESSES: INVENTOR
E. Theodore Winkler
By S. J. Van Stavoren
ATTORNEY

UNITED STATES PATENT OFFICE.

EHREGOTT THEODORE WINKLER, OF PHILADELPHIA, PENNSYLVANIA, ASSIGNOR, BY MESNE ASSIGNMENTS, TO THE AMERICAN ICE MACHINE COMPANY.

ICE-MAKING AND REFRIGERATING MACHINE.

SPECIFICATION forming part of Letters Patent No. 452,536, dated May 19, 1891.

Application filed September 20, 1887. Serial No. 250,220. (No model.)

*To all whom it may concern:*

Be it known that I, EHREGOTT THEODORE WINKLER, a subject of the Emperor of Germany, having declared my intention to become a citizen of the United States, residing at Philadelphia, in the county of Philadelphia and State of Pennsylvania, have invented certain new and useful Improvements in Ice-Making and Refrigerating Machines, of which the following is a specification.

My invention has relation to that class of ice-making or refrigerating machines in which the flow of the volatile fluid or gases generated therefrom is controlled by the pressure in the machine acting upon a governor which regulates the position of the flow-valve. Heretofore the governor has been connected in the refrigerating-circuit at a point or position between the condenser and the evaporator, so that any variation of the pressure must be passed back through the evaporator before it can reach the governor.

The object of my invention is to so locate the governor in the refrigerating-circuit that back-pressure through the evaporator will be avoided. This is accomplished by connecting the governor with the exhaust or low-pressure pipe leading from the evaporator to the corresponding side of the pump, so that any slight variation of the pressure will be quickly felt and acted upon by the governor, which, in practice, is set at a working or normal pressure that is practically maintained by the governor.

My invention therefore consists of the combinations, constructions, and arrangements of parts, as hereinafter described in the specification and pointed out in the claim.

Reference is had to the accompanying drawings, wherein—

Figure 2:
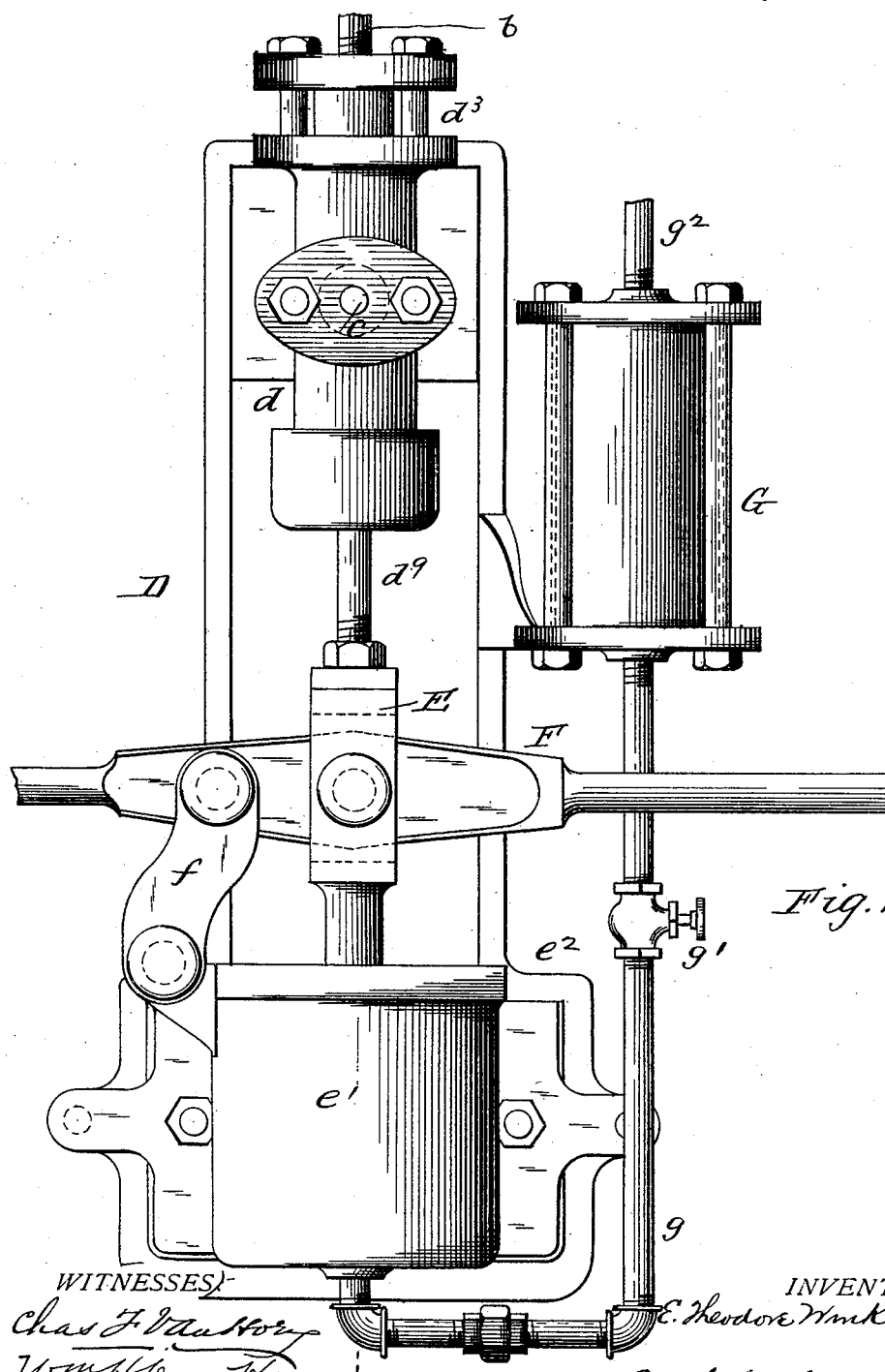
Figure 3:
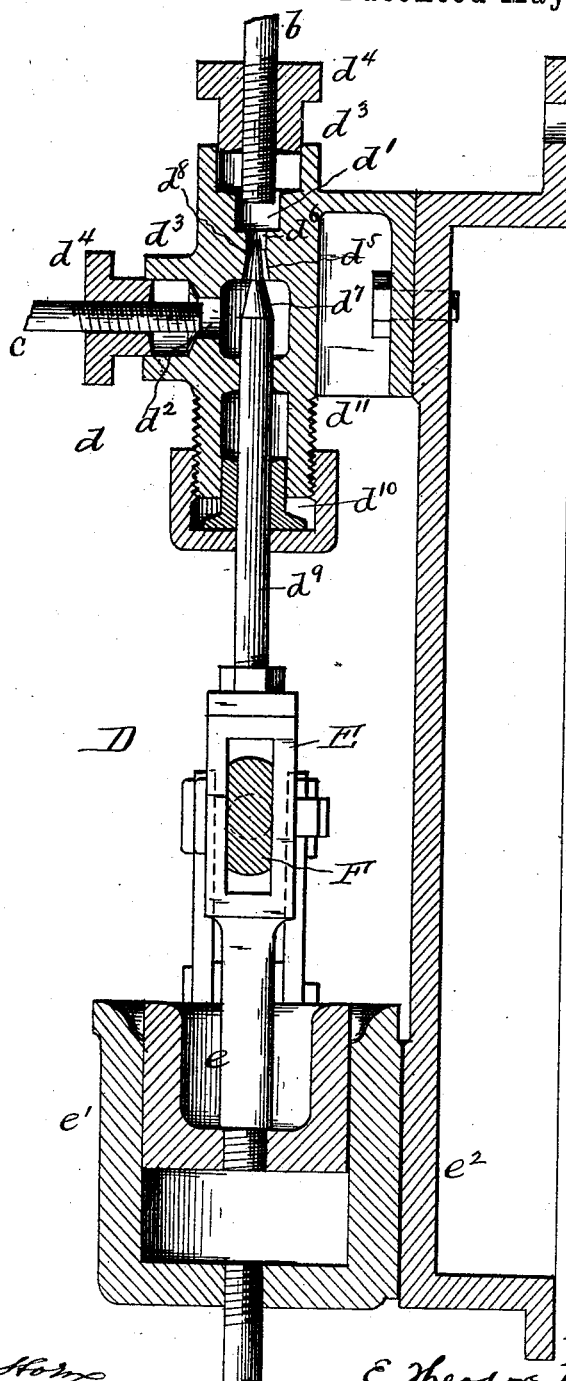

Figure I is a diagrammatic view of some of the parts of an ice-making or refrigerant apparatus, some parts in section and some in elevation, showing the application of my improvements; Fig. 2, an elevation drawn to an enlarged scale of the regulator or governor detached; and Fig. 3, a section on the line 1 1, Fig. 2.

A indicates the compression-pump; B, the condenser; C, the expansion, evaporation, or freezing coil or chamber, which for brevity I shall term an "evaporator," all of which are constructed and arranged for operation in the usual or other desired way, except that the pipe $b$ from the condenser leads to a flow-valve $d$, forming part of a regulator or governor D. The valve $d$ may be of any suitable construction; but I prefer to make it as shown more plainly in Fig. 3, in which the casing inlet and outlet openings $d'$ and $d^2$, respectively, having stuffing-boxes $d^3$, provided with loose sliding glands $d^4$, to which are respectively secured the end of pipe $b$ from the condenser and the end of pipe $c$ from the evaporator C to form expansible joints or connections therewith in a manner fully set forth in another pending application filed of an even date herewith, Serial No. 250,219. In the casing between the inlet and outlet openings is a seat preferably of a conical or tapering form, as shown at $d^5$, which terminates in a contracted opening $d^6$, forming a communication between said inlet and outlet openings. To said seat is adapted a conical plug $d^7$, having plunger $d^8$, for sliding to and fro in contracted opening $d^6$ as the valve is opened and closed to keep said opening clear or free from dirt or débris tending to collect therein. The plug $d^7$ is secured to or forms a part of a loose sliding stem $d^9$, which passes through a bottom stuffing-box $d^{10}$ on the casing $d^{11}$, and is secured in any suitable manner to a yoke E. The latter has a depending plunger $e$, moving up and down in an open-top cylinder $e'$, secured to a bracket $e^2$, to which is also affixed the valve $d$, as shown more plainly in Figs. 2 and 3.

In yoke E is pivoted, knife-edged, or otherwise mounted a beam F, having preferably a link-connection $f$ with the cylinder $e'$ or other fixture.

Figure 1:
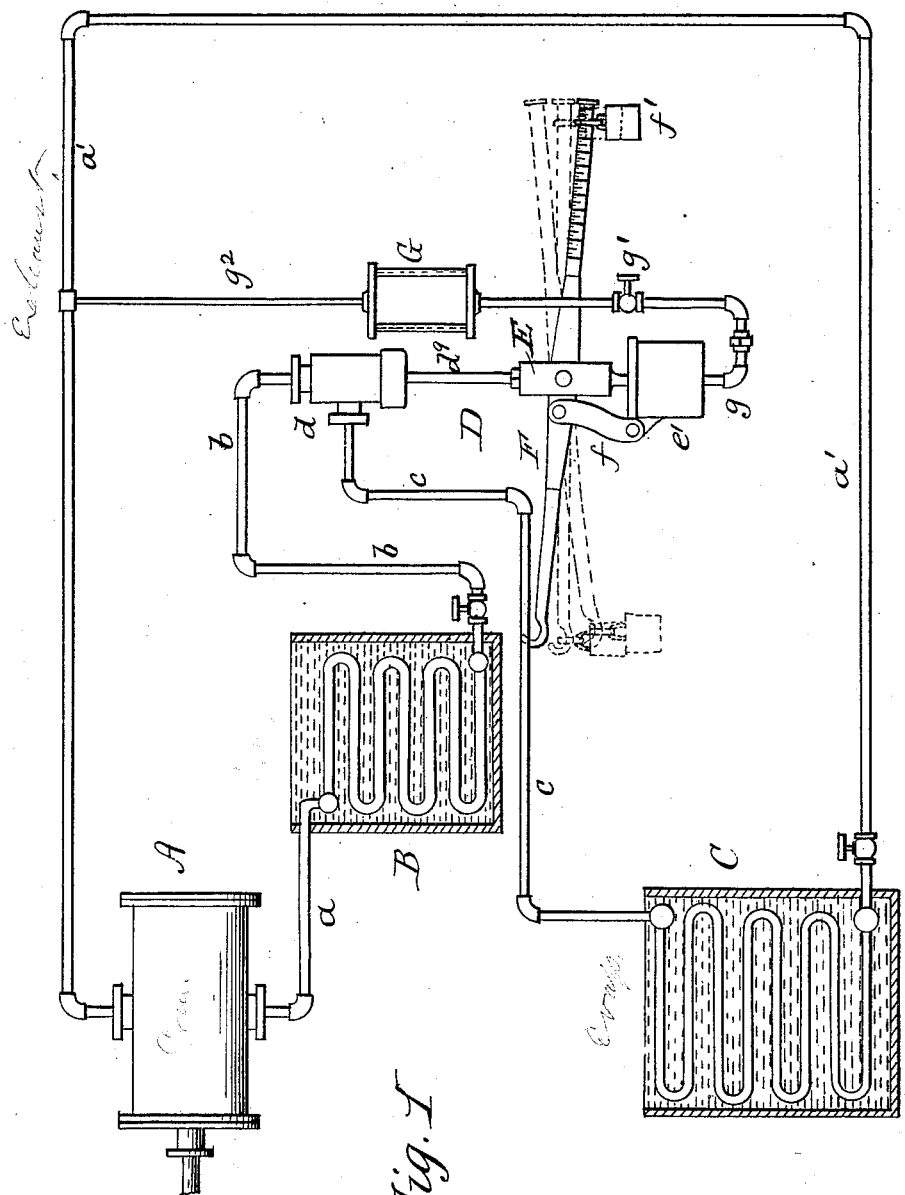

At one end of the beam F is preferably a hook and at the other a scale or indicator, along which slides a weight $f'$. (Seen more plainly in Fig. 1.)

From the bottom of cylinder $e'$ a pipe $g$, having a stop-cock $g'$, leads to chamber G, of any suitable construction, which, if desired, may be secured to the bracket $e^2$. From the top of the chamber G leads a pipe $g^2$, which is at its opposite end coupled at any suitable point to the suction-pipe $a'$ for the pump A. As the valve $d$ controls the circulation of the compressed or liquefied gas from the condenser B to the evaporator C, it follows that as valve $d$ is more or less opened or closed the flow of the liquid gas is varied as desired, and by adjusting such valve from time to time as the pressures of compression and evaporation vary they may be equalized. This equalization is automatically accomplished by the use of the above-described cylinder, beam, and chamber devices, as follows: The weight $f'$ is first adjusted or set along the scale on beam F to the pressure desired to be maintained or fixed for the working or normal pressure of the ice or refrigerating apparatus. This adjustment tilts the weighted end of the beam, as indicated in full lines, Fig. 1, and lowers the yoke E, and with it the valve-stem $d^9$, to open valve $d$, whereupon the required volume of the liquid gas from condenser B flows through valve $d$ to evaporator C. This described adjustment of said valve remains constant as long as the pressure in the suction or expansion pipe is equal to the normal working-pressure. Any variation, however, in said pressure, either above or below the normal, results in an up or down movement of the piston $e$ in cylinder $e'$, which movement in turn is communicated to stem $d^9$ to either close or further open valve $d$, respectively, so as to decrease or increase the volume of flow from the condenser to the evaporator until the pressures again equalize themselves. The movement of piston $e$ is influenced by the variation of pressure acting through the branch pipes $g^2$ from the suction-pipe $a'$ and through chamber G and pipe $g'$. The amount of gas admitted to cylinder $e'$ is regulated by the cock in pipe $g'$.

To prevent too sudden movement of piston in cylinder, I prefer to fill the pipe $g'$ and the chamber G with oil or other suitable liquid to serve as a cushion and produce a gradual movement for the piston and valve-stem $d^9$, thereby avoiding a jumping or a too quick movement of the valve-stem when automatically adjusted. If the variation in pressure is such that it rises above the fixed or desired pressure, the valve $d$ moves to reduce the volume of liquefied gas passing through it, and when the pressure is again equalized the weight on beam F opens the valve $d$ to its normal position. If the variation in pressure is such that it is below the fixed or desired pressure, the weight on beam F still further opens valve $d$ to increase the volume of flow therethrough, and as the pressure equalizes itself or returns to the fixed pressure it automatically acts upon the oil in chamber G and pipe $g'$ to raise the piston to return the valve to its normal position. Thus, it will be noted, the normal opening of valve $d$ is controlled by the adjustment of weight $f'$ on beam F, and the variations of pressure in the pipe $a'$ automatically control its further opening or gradually closing to keep the working-pressures constant. By doing this an even temperature is maintained in the evaporating or freezing chamber, and laboring of the machine at one time and racing at another under variations of pressure are avoided. Hence the machine is always doing its full effective work without loss or waste.

By changing the weight $f'$ to the hook end of beam F the regulator works as above described when pumping vacuum or when pumping the liquefied gas out of the machine.

I do not limit myself to the details of construction shown and described, as it is evident that they may be greatly varied without departing from the spirit of my invention.

What I claim is—

In a refrigerating apparatus, the combination of a high and low pressure pump, a condenser having pipe-connection with the high-pressure side of the pump, an outlet-pipe for the condenser, having a flow-valve, an evaporator having pipe-connection at one end with the condenser outlet-pipe and at the other with the low-pressure side of the pump, and a governor engaging at one end with said flow-valve and connected at the other end with the pipe between the evaporator and the low-pressure side of the pump, the pressure in said pipe actuating the governor to control the flow-valve, substantially as set forth.

In testimony whereof I affix my signature in presence of two witnesses.

E. THEODORE WINKLER.

Witnesses:
JOHN RODGERS,
S. J. VAN STAVOREN.